United States Patent
Röber et al.

(10) Patent No.: US 10,611,887 B2
(45) Date of Patent: Apr. 7, 2020

(54) METHOD FOR PRODUCING MASTERBATCHES

(71) Applicant: DAW SE, Ober-Ramstadt (DE)

(72) Inventors: Friedhelm Röber, Grimma (DE); Matthias Hübner, Markkleeberg (DE)

(73) Assignee: DAW SE, Ober-Ramstadt (DE)

( * ) Notice: Subject to any disclaimer, the term of this patent is extended or adjusted under 35 U.S.C. 154(b) by 155 days.

(21) Appl. No.: 15/211,197

(22) Filed: Jul. 15, 2016

(65) Prior Publication Data

US 2017/0015795 A1    Jan. 19, 2017

(30) Foreign Application Priority Data

Jul. 16, 2015   (EP) ..................... 15177170

(51) Int. Cl.
| | |
|---|---|
| *C08L 23/14* | (2006.01) |
| *C08J 3/22* | (2006.01) |
| *C08L 67/02* | (2006.01) |
| *C08L 77/02* | (2006.01) |

(52) U.S. Cl.
CPC ............ *C08J 3/22* (2013.01); *C08J 3/226* (2013.01); *C08L 23/14* (2013.01); *C08L 67/02* (2013.01); *C08L 77/02* (2013.01); *C08J 2483/04* (2013.01)

(58) Field of Classification Search
CPC ... C08J 3/22; C08J 3/226; C08L 23/14; C08L 67/02; C08L 77/02
USPC ....................................................... 523/351
See application file for complete search history.

(56) References Cited

U.S. PATENT DOCUMENTS

| | | | |
|---|---|---|---|
| 5,418,311 A | 5/1995 | Schäfer et al. | |
| 5,814,697 A * | 9/1998 | Akao | .................. C08J 3/226 428/35.7 |
| 2008/0139735 A1 | 6/2008 | Reisacher et al. | |

FOREIGN PATENT DOCUMENTS

EP   2 113 522 A1   11/2009

OTHER PUBLICATIONS

European Search Report, dated Jan. 29, 2016, for European Application No. EP 15177170.6-1308, 7 pages.

* cited by examiner

*Primary Examiner* — Hannah J Pak
(74) *Attorney, Agent, or Firm* — Seed IP Law Group LLP

(57) ABSTRACT

The present disclosure relates to methods for producing a masterbatch, comprising the following steps
a1) providing one or more siloxane compounds, terminated with at least one or with two or more amino-, hydroxy-, carboxy-, carboxylate-, carboxylic acid ester or carboxylic acid anhydride groups with the general formula (component A1):

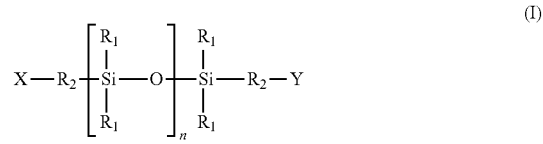

(I)

a2) providing one or more at least bifunctional compounds (component A2), which comprises two or more, groups that can be linked to X and Y; a3) providing one or more dyes (component A3) and/or a4) providing one or more functional additives (component A4); b) mixing the components according to a1), a2) and a3) or according to a1), a2) and a4), or according to a1), a2), a3) and a4); c) polymer formation of the mixture according to b), and d) melting and/or retaining the molten liquid state of the polymerisate formed in step c) in the extruder or in the discontinuous internal mixer, and e) transferring the polymerisate in according to step d) into a solid aggregate state.
The present disclosure also describes masterbatches obtained or obtainable according to the aforementioned methods and polymer material obtained or obtainable by admixing one or more polymers and one or more of the aforementioned masterbatches. Moulded bodies, obtained or obtainable with injection moulding, extruding, compression moulding, roll rotation, rotation moulding, laser sintering, Fused Deposition Modelling (FDM), granulation and/or casting of the aforementioned polymer material are also described.

12 Claims, No Drawings

METHOD FOR PRODUCING MASTERBATCHES

BACKGROUND

Technical Field

The present disclosure relates to a method for producing masterbatches. Furthermore, the present disclosure relates to masterbatches obtained by the method according to the present disclosure. Additionally, the present disclosure relates to the use of the masterbatches obtained by the method according to the present disclosure for colouring polymer materials and for equipping polymer materials with functional additives.

Description of the Related Art

Masterbatches are regularly used for the application-specific modification of synthetic materials. In this connection masterbatches are polymer-bound additive concentrates. One advantage of such masterbatches is that they must regularly be added to a polymer material in only very low quantities in order to create the desired colouring or modification. These quantities are regularly in the region of two to five percent. Generally, two classification systems are used for dividing masterbatches. According to one system, masterbatches can be divided into colour, additive and combination masterbatches. This division is function-oriented. According to the other system, masterbatches can be subdivided into universal and polymer-specific masterbatches, with a view to the polymer matrix material to which these masterbatches are added. Due to compatibility problems which arise due to the partial incompatibility of the polymers, which are used on the one hand for the masterbatch and on the other for the polymer matrix material, and which result in de-mixing phenomena and dispersing errors, universal masterbatches are still regularly problematic for many applications, although universal masterbatches would certainly offer considerable potential for rationalisation with regard to storage and logistics. Currently, there are a number of specific masterbatch types for every synthetic material class.

The successful use of masterbatches also lies in the fact that solid-based additives can be present in masterbatch preparations in an either fully or almost fully dispersed state. As a result, dispersive mixing to break up and dissipate agglomerates and aggregates is hardly necessary at all during the production of synthetic materials. Accordingly, no additional dispersing agents are usually required when adding masterbatches to polymer matrix materials. Masterbatches are generally obtained in the form of granules. In this connection, the masterbatches which are in some cases very easy to handle are those in which the granules are pourable and dust-free.

Masterbatches are generally produced according to a single-step or dual-step method. With single-step production, all raw material components are provided and extruded. With the dual-step method, so-called 'monoconcentrates' are first produced, which are then mixed once again and, if need be, mixed with additives, before being extruded. The homogeneity of the colour tone in the synthetic material depends on what flow behaviour is achieved in the molten mass, or how well the masterbatch is distributed in the matrix. In many cases, it is not possible, or only to an inadequate degree, to work pigments into a masterbatch while at the same time retaining a homogeneous colouring. For example, pigments produced through dry calcination can regularly only be distributed with a high energy input, and also can usually only be partially distributed in a masterbatch. The term also used here is "hard to disperse" pigments.

BRIEF SUMMARY

It is desirable to find masterbatches which can be used as universal masterbatches for a broad range of polymer matrix materials. For this reason, embodiments of the present disclosure are designed to provide a method for producing masterbatches which enables economic, reliable access to universal masterbatches. Further, embodiments of the present disclosure are designed to provide masterbatches which do not lead to deposits, either during processing in the extruder or during mixing into polymer matrix materials, and also not during the re-processing of the molten polymer materials in injection moulding machines, for example (this phenomenon is also known as the "plate-out" effect), and which are capable of suppressing the plate-out effect. Additionally, embodiments of the present disclosure are designed to provide masterbatches which after being mixed into polymer matrix materials do not lead to the formation of streaks in the polymer materials obtained as a result. Furthermore, embodiments of the present disclosure are designed to be able to mix in pigments, additives and/or fillers into the masterbatch regardless of their dwell time and/or thermal load. Finally, embodiments of the present disclosure are designed to provide masterbatches with which pigments, additives and/or fillers which are also difficult to disperse can be homogeneously mixed into a, in some cases random, synthetic material mix, and in other cases without being dependent on the use of dispersion agents.

Accordingly, in one or more embodiments a method for producing a masterbatch comprises the following steps:

a1) providing one or more siloxane compounds, terminated with one or more, in some cases with at least two or precisely two, amino-, hydroxy-, carboxy-, carboxylate-, carboxylic acid ester or carboxylic acid anhydride groups with the general formula (component A1):

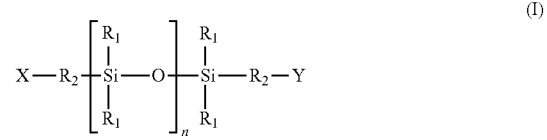

(I)

with

R1 Independently of each other, a monovalent hydrocarbon residue with 1 to 20 carbon atoms, optionally substituted with fluorine or chlorine, R2 Independently of each other, an alkylene residue with 1 to 20 carbon atoms, in which methylene units which are not adjacent to each other can be replaced by groups —O—, or an arylene residue with 6 to 22 carbon atoms, X, Y Independently of each other, a hydroxy, carboxy, carboxylate, carboxylic acid ester, carboxylic acid anhydride or amino group NHR' with R'=hydrogen, alkyl residue with 1 to 10 carbon atoms, in some cases methyl, ethyl or i- or n-propyl, in some further cases n-propyl, or aryl residue with 6 to 22 carbon atoms, and in even further cases an NH$_2$ group, in some cases jointly, and n A number from 75 to 215, in some cases 80 to 200;

a2) Providing one or more at least bifunctional, in some cases bifunctional, compounds (component A2), which comprises two or more, in some cases two, groups that can be linked to X and Y, in some cases by polyaddition or polycondensation;

a3) Providing one or more dyes (component A3) and/or a4) Providing one or more functional additives (component A4);

b) Mixing the components according to a1), a2) and a3) or according to a1), a2) and a4), or according to a1), a2), a3) and a4);

c) Polymer formation of the mixture according to b), and d) Melting and/or retaining the molten liquid state of the polymerisate formed in step c), in some cases in the extruder or in the discontinuous internal mixer, and e) Transferring the polymerisate in accordance with step d) into a solid aggregate state, in some cases in granular or powder form.

DETAILED DESCRIPTION

According to a further development of the methods according to the present disclosure, this further comprises a5) Providing one or more siloxane compounds, terminated with one or more, in some cases with at least two, amino-, hydroxy-, carboxy-, carboxylate-, carboxylic acid ester or carboxylic acid anhydride groups with the general formula (component A5):

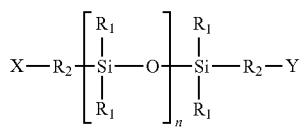

(I)

with

R1 Independently of each other, a monovalent hydrocarbon residue with 1 to 20 carbon atoms, optionally substituted with fluorine or chlorine, R2 Independently of each other, an alkylene residue with 1 to 20 carbon atoms, in which methylene units which are not adjacent to each other can be replaced by groups —O—, or an arylene residue with 6 to 22 carbon atoms, X, Y Independently of each other, a hydroxy, carboxy, carboxylate, carboxylic acid ester, carboxylic acid anhydride or amino group NHR' with R'=hydrogen, an alkyl residue with 1 to 10 carbon atoms, in some cases methyl, ethyl or i- or n-propyl, in some further cases n-propyl, or an aryl residue with 6 to 22 carbon atoms, in even further cases an $NH_2$ group, and in some cases jointly, and n a number from 20 to 74, in some cases 25 to 70, and in step b), mixing the components according to a1), a2), a3) and a5), or according to a1), a2), a4) and a5), or according to a1), a2), a3), a4) and a5).

In the methods according to the present disclosure, for the siloxane compound A1 provided in step a1), in some cases those compounds are used with which n is a number in the range of 100 to 180, in some cases in the range of 110 to 160. For the siloxane compounds A5 provided in step a5), n is in some cases a number in the range of 30 to 60, and in other cases in the range of 35 to 50.

The figure relating to the repeating units "n" is in a further embodiment the average number of repeating units in the siloxane compounds A1) and A5), as they are used in the production of masterbatches according to the present disclosure. In some cases, the figure relating to the repeating units "n" is an absolute figure.

In some embodiments the siloxane compounds provided in step a1) and/or a5) are present in fluid form at room temperature (20° C.). By varying the components A1) and A5), the carrier polymers of the masterbatch can be optimally adapted to the rheological conditions of the polymer materials to be modified without changing their ability to be mixed in.

For the siloxane compound A1 provided in accordance with a1) and/or for the siloxane compound A5 provided in accordance with a5), those compounds are suitable in which R1 Independently of each other, is methyl, ethyl, n-propyl, i-propyl, n-butyl, i-butyl, n-pentyl or i-pentyl, in some cases methyl, and/or R2 Independently of each other, is a methylene, ethylene, propylene, butylene, pentylene or hexylene residue, in some cases a propylene residue, and in other cases an n-propylene residue.

In some embodiments the method according to the present disclosure is designed in such a manner that the siloxane compound A1) provided in step a1) is such a compound, in some cases an α,ω aminopropyl-terminated polydimethyl siloxane, with an average molar mass in the range of 6,000 to 14,000 g/mol, and in other cases in the range of 9,000 to 13,000 g/mol. Furthermore, in some cases satisfying results can also be obtained by using in step a5) for the siloxane compound (A5), in some cases an α,ω aminopropyl-terminated polydimethyl siloxane, with an average molar mass in the range of 2,000 to 5,500 g/mol, and in other cases in the range of 2,500 to 4,000 g/mol.

For the method according to the present disclosure, those bifunctional monomers (component A2) in accordance with a2)) are in some cases suitable which are selected from the group consisting of diisocyanates, diamines, diols, dicarboxylic acids, diformaldehyde-terminated compounds and mixtures thereof.

For the bifunctional monomers (component A2) in accordance with a2), diisocyanates with the general formula (II) have been shown to be in some cases of use:

(II)

wherein R3 is an alkylene residue, that is optionally substituted with fluorine or chlorine, having 1 to 20 carbon atoms, in which methylene units which are not adjacent to each other can be replaced by groups —O—, or an arylene residue with 6 to 22 carbon atoms.

In this connection, those bifunctional compounds in accordance with a2) are in some cases suitable which are selected from the group consisting of aliphatic diisocyanates, in some cases 1,6-diisocyanate-hexane, 3-isocyanate methyl-3,5,5-trimethylcyclohexyl isocyanate and/or 1-isocyanato-4-[(4-isocyanatocyclohexyl)-methyl]cyclohexane, and aromatic diisocyanates, in some cases 2,4-toluylenediisocyanate, 4,4'-2,2'-diphenylmethane diisocyanate, 2,4'-2,2'-diphenylmethane diisocyanate, 2,2'-diphenylmethane diisocyanate, 4-methyl-m-phenylene diisocyanate, 1,3-bis-(1-isocyanato-1-methylethyl)-benzene, polyphenyl-polymethylene-polyisocyanates and/or urethane-modified 4,4'-diphenylmethane diisocyanates or their mixtures. In this connection, aliphatic diisocyanates are preferred.

In some cases, the method according to the present disclosure also provides reliably good results when the compounds with the general formula (I) (component A1) and the at least bifunctional compounds, in some cases the bifunctional compounds (component A2), are used in equimolar quantity ratios.

With methods according to the present disclosure, it is advantageous to mix the dyeing agent and/or functional additive (components a3) and a4)) with the siloxane compounds according to component A1) and optionally A5), and/or the at least bifunctional compound according to component A2), and in some cases with the siloxane compound according to component A1) and the at least bifunctional compound according to component A2), or with the siloxane compound according to components A1) and A5) and the at least bifunctional compound according to component A2) prior to the start of the polymer formation in accordance with step c). Alternatively, it is also possible to add a portion of the dyeing agent, in some cases pigments, and/or functional additives, during the polymer formation in accordance with step c).

The dyeing agents and/or the functional additives are in some cases added to the siloxane compounds in accordance with component A1. In this connection, fluid siloxane compounds in accordance with component A1 can in some cases be suitable. To homogeneously disperse dyeing agents and/or functional additives into the in some cases fluid siloxane compounds does not in general present any problem to persons skilled in the art. The polysiloxane compounds in accordance with component A1 are in this connection in some cases used with molar masses greater than or equal to 10,000 g/mol. In some cases suitable polysiloxane compounds are thus present as oligomers.

When the dyeing agent and/or functional additive is added before or partially during the reaction of components A1 and A2 to the finished colour masterbatch, the product is obtained in just one extrusion step, and furthermore, with a very high incorporation quality and at the same time, very high product quality and absence of product impairment. For example, the carrier material of the masterbatch is only thermally loaded one single time before final use. As a result, the influence of thermal degradation reaction on the matrix is reduced. One advantage of embodiments of the present disclosure is that dyeing agents, in some cases pigments, fillers and/or functional additives can be dispersed independently of dwell time and furthermore without a thermal load. This applies even to so-called "hard to disperse" systems, i.e. systems that are difficult to disperse, such as hard dispersal pigments. A further advantage is that absolutely no use of dispersal aid agents, such as wax, is required, without leading to impairment of the desired result. In this connection, the fact can be exploited that pigments and/or functional additives can initially be incorporated into the fluid or pasty siloxane compound in accordance with components A1) and A5) without a time limit and without a thermal load, which is otherwise always a mandatory requirement. For example, this is achieved by a laboratory dissolver, for example at approx. 1,000 revolutions per minute for 10 minutes. If further dispersal is required, as an alternative or in some cases additionally, one or more friction procedures can be implemented on a laboratory three-roll friction stool or in a pearl friction mill. In this manner, pigments and functional additives are easily obtained with a disintegration size of less than 10 μm. The degree of dispersal can here be determined using a grindometer, for example.

Suitable dyeing agents include pigments, dyes or mixtures of these. Both inorganic and organic pigments are suitable for use as pigments. Suitable inorganic pigments can for example be selected from the group consisting of oxides, e.g. iron oxide (brown, red, black), chrome oxide (green) or titanium oxide (white), carbon, e.g. rust-black, chromates, e.g. lead chromate-yellow, molybdate-orange, complexes of colourful inorganic pigments, e.g. chrome titanium yellow, chrome iron brown, cobalt blue, nickel titanium yellow, zinc iron brown or bismuth vanadate yellow, and sulphides, e.g. cadmium sulphide (yellow, orange, red), cerium sulphide (yellow, orange, red), ultramarine (violet, blue) or zinc sulphide (white), or any mixtures of these. Suitable organic pigments can be selected from the group consisting of azo pigments, such as lacquered azo pigments (yellow, red), disazo pigments (yellow, orange, red), disazo condensation pigments (yellow, red), benzimide azo pigments (yellow, orange), metal complex pigments (yellow), isoindoline pigments (yellow), isoindolinon pigments (yellow) and polycyclical pigments, e.g. quinacridone (violet, blue), quinophthalone (yellow), diketo-pyrrolo-pyrrol (orange, red, violet), disoxazine pigments (violet), indanthron (blue), perylene (red, violet) or phthalocyanine (blue, green) or any mixtures of these.

In contrast to pigments, dyes are dyeing agents which are soluble in the matrix material to be coloured. Suitable dyes can be selected, for example, from the group consisting of anthraquinone, quinophthalone, pyrazolone, perinone, monoazo dyes and fluorescent dyes, e.g. perylene, naphthalimide, cumin derivatives, thioindigo or thioxanthene benzanthrone or any mixtures of these.

If dyeing agents are used with the methods according to the present disclosure, pigments are in some cases a suitable option.

Suitable functional additives can for example be selected from the group consisting of nucleation agents, nanofil substances, phyllosilicates, in some cases delaminated phyllosilicates, stabilisers, in some cases thermostabilisers, and/or light stabilisers, antistatic agents, flame retardant agents, bonding agents, anti-blocking agents, processing aids, propellants, anti-microbial agents, in some cases anti-bacterial agents, and mixtures of these.

With the methods according to the present disclosure, it is possible to incorporate dyeing agents, in some cases pigments, and/or functional additives into the masterbatches over a very broad concentration range. Thus, it is possible in or by use of step b) to incorporate into the masterbatches 1 to 90 weight percent, in some cases 5 to 85 weight percent, and in other cases 10 to 80 weight percent of dyeing agent, in some cases pigments, in relation to the weight of the polymer obtained in step e) respectively. Further, the method according to the disclosure makes it possible to integrate as a functional additive into the masterbatches 1 to 80 weight percent, in some cases 2 to 70 weight percent, and in other cases 5 to 50 weight percent in relation to the weight of the polymer obtained in step e).

With the methods according to the present disclosure, chain extenders can also be added. Useful chain extenders contain two, three or more functional groups which are reactive with isocyanates, whereby bifunctional chain extenders are in some cases suitable. Suitable chain extenders which are reactive with isocyanates usually have a low molecular weight. Examples of these are polyols, such as diols, and secondary polyamines, such as diamines.

In a further development of the methods according to the present disclosure, it is provided that after mixing the components in accordance with step b), in some cases directly after ending the addition of the components, one or more chain extenders (component B)) is added with the general formula III:

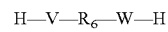  (III)

with

R4 An alkylene residue with 1 to 700 C atoms, which is optionally substituted with fluorine, chlorine, C1-C6-alkyl or C1-C6-alkyl ester, in which methylene units which are not adjacent to each other can be replaced by groups —O—, —COO—, —OCO— or —OCOO—, and V, W Independently of each other —O— or —NR", wherein R" is hydrogen, an alkyl residue with 1 to 10 C atoms, in some cases methyl, ethyl or i- or n-propyl, in other cases n-propyl, or an aryl residue with 6 to 22 C atoms.

In some cases, diols and diamines can be considered as possible chain extenders. In this connection, in some cases suitable chain extenders can be selected from the group consisting of 4,4-methylenebis-(2-chloroaniline), 2,3-bibrom-2-butene-1,4-diol, ethylene glycol, 1,2 and 1,3-propane diol, 1,3 and 1,4 and 2,3 butane diol, diethylene glycol, dipropylene glycol, triproprylene glycol, 1,6-hexane diol, 1,4-cyclohexane dimethanol, 3-methyl-1,5-pentane diol, neopentyl glycol, 4,4'-methylenebis(2-chloroaniline), 1,3-di-(4-piperidyl)propane (DIPIP), N-(2-aminoethyl)-propyl-methyldimethoxysilane (DAS), piperazine, N,N'-dialkyl (methylene)dianiline, N,N'-dialkyl(1,4-diamino)benzene, N,N'-Bis(diisopropylmethyl)diaminoethane and N,N'-Bis(t-butyl)diaminocyclohexane, ethylenediamine, aspartic acid ester polyamines, 2-methyl-1,5-pentanediamine and 1,2-propandiamine or any mixtures of these.

The polymer formation in step c) is in some cases conducted at temperatures of 20° C. or more. Generally, however, work can also be conducted at lower temperatures.

The methods according to the present disclosure can in an advantageous design essentially be implemented in a humidity-free environment and/or under protective gas, in some cases nitrogen or argon.

Such a way of implementing the methods regularly leads to advantageous results, in which step c) and step d), and optionally also step b), are conducted in an extruder comprising one or more conveying elements.

In order to facilitate a complication-free implementation of the methods, the extruder can be degassed in step c) and optionally also in step d), in some cases using vacuum degassing.

In some cases advantageous implementation of the methods according to the present disclosure, it is provided that the components according to a1) and a3) or a1) and a4) or a1), a3) and a4) or a1), a5) and a3) or a1), a5) and a4) or a1), a5), a3) and a4) are mixed, in some cases by admixing or extrusion, and that the mixture obtained is mixed, in some cases in a fluid or paste form, with component a2), in some cases by admixing or extrusion, in some cases said component a2) is added to the mixture obtained.

Component A2, the at least bifunctional monomer, is in some cases added in the region of one or more conveying elements, in some cases by a spray nozzle, and in other cases by a capillary spray nozzle, to component A1) or to components A1) and A5), respectively, and is optionally added to the further components A3) and/or A4).

Additionally, in some cases it can be provided that the components according to a3) or a4) or a3) and a4) are mixed with a first portion of the component according to a1), and that the mixture obtained is mixed, in some cases in fluid or paste form, with the remaining portion of the component according to a1), in some cases by admixing or extrusion.

In order to secure a consistently flawless method procedure, in an embodiment of the methods according to the present disclosure, it can be provided that the extruder is sealed in the transfer from the gears to the screw cylinder, in some cases by gland packing.

According to a further embodiment of the methods according to the present disclosure it is provided that this further comprises: a6) providing one or more dispersing agents, selected from the group consisting of waxes, in some cases PE (polyethylene) waxes, ethylene vinyl acetate-copolymer waxes and/or montan waxes, metal soaps, in some cases Mg, K and/or Zn stearates, organic fatty acids and organic fatty acid esters or their random mixtures, wherein in step b) the components according to a1), a2), a3) and a6), or according to a1), a2), a4) and a6), or according to a1), a2), a3), a4) and a6), or according to a1), a2) a3), a5) and a6), or according to a1), a2), a4), a5) and a6), or according to a1), a2), a3), a4), a5) and a6) are mixed.

In step c) of the polymer formation, copolymers are formed from the siloxane compounds (component A1) and optionally component A5)) and the at least bifunctional monomers (component A2). When chain extenders are used, as described above, these components are also integrated into the copolymer chain. For the copolymer formation, in some cases, the polyaddition or polycondensation reaction is used, with the elimination of e.g. water. In order to form these copolymers, two bifunctional components are generally required: on the one hand a bifunctional component A1, which contains an organic silicon compound, and on the other hand a bifunctional component A2. The functional groups of component A2 are in this connection regularly created in such a manner that they are capable to react with the functional groups of component A1. If component A1 and component A2 are used in stoichiometric conditions, i.e. in a molar ratio of 1:1, copolymers are regularly formed in which component A1 and component A2 alternate.

If a chain extender is additionally integrated into the copolymer the reaction to the macromolecule generally follows in two steps. However, single-step method progressions are also possible. In this connection, it is advantageous first to again bring component A1 and component A2 to reaction, wherein the molar ratio between A1 and A2 is selected in such a manner that only relatively short copolymer chains are created with the precise structure BAB. The molar ratio between A1 and A2 is in this connection in some cases 1:2. In a second reaction step, which occurs at a later time, the chain extender is then added. From the structure of the chain extender given above, it can be deduced that it is in some cases also bifunctional, and that the functional groups of the chain extender are able to react with the functional groups of component A2. Ultimately, copolymers are created through this reaction with the sequence . . . BABCBABC . . .

It has been shown that the polymer compound obtained in step c), the siloxane unit (A1) integrated therein tends to be nonpolar, while component A2 and optionally also the chain extender contribute to the polar nature of the polymer compound. By varying nonpolar and polar comonomer units, the copolymers obtained in step c) can be adapted to a very wide range of polymer materials in terms of their compatibility. Accordingly, it is an advantage of the present disclosure that with the masterbatches obtainable by the methods according to the present disclosure, a very wide range of different polymer materials can be modified without having to fear compatibility problems. With the methods according to the present disclosure, access is thus possible to so-called universal masterbatches. Additionally, due to the generally nonpolar nature of the siloxane units (A1) integrated into the polymer in step c), it is possible to obtain surfaces of polymer materials equipped with the masterbatches obtained by the methods according to the present disclosure which are nonpolar, i.e. hydrophobic. Their surfaces can be equipped to be more or less water repellent in this manner. This is even possible with polar polymer matrix materials such as polyesters, e.g. PET, or polyamides.

The polymer material of the masterbatches obtainable by the methods according to the present disclosure not only has the advantageous property of taking up dyeing agents, in some cases pigments and/or functional additives over a very broad concentration range in homogeneous distribution, and without the formation of agglomerates or aggregates occurring, but at the same time also acts as a process auxiliary agent and/or a viscosity modifier. Thus it is possible for example to significantly reduce the cycle times during production according to the injection moulding method by using the masterbatches obtainable by the methods according to the present disclosure, even with otherwise constant process parameters. Furthermore, when the masterbatches obtainable by the methods according to the present disclosure are used in the extrusion procedure, the throughput can be increased even under otherwise constant conditions. With these masterbatches according to the present disclosure, it is thus possible to regularly achieve a more economic manner of implementing the methods during the further processing.

The polymer materials equipped with the masterbatches obtained by the methods according to the present disclosure are frequently characterised by greater elasticity, even at low temperatures.

In some cases high yields can also be achieved when with the methods for producing masterbatches according to the present disclosure a catalyser is added from the group containing dialkyltin compounds, dibutyltin dilaurate, dibutyltin diacetate, tertiary amines, N,N-dimethylcyclohexanamine, 2-dimethylaminoethanol, 4-dimethylaminopyridine and/or mixtures of these.

Embodiments of the present disclosure are further attained by a masterbatch which is obtained or obtainable by the methods according to the present disclosure. Masterbatches of this type comprise colouring masterbatches, functional additive masterbatches and combination masterbatches containing one or more dyeing agents, in some cases pigments, and one or more functional additives. Colouring masterbatches contain one or more dyeing agents, in some cases one or more pigments, while functional additive masterbatches contain one or more functional additives. Masterbatches according to the present disclosure can be present in granular or powder form, whereby the granular form is in some cases suitable.

The masterbatches obtainable by the methods according to the present disclosure in some cases contain one or more copolymers or block copolymers with the general formula IV

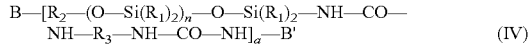

(IV)

with $R_1$ independently of each other, being a monovalent hydrocarbon residue with 1 to 20 carbon atoms, optionally substituted with fluorine or chlorine, in some cases methyl, $R_2$ independently of each other, being an alkylene residue with 1 to 20 carbon atoms, in which methylene units which are not adjacent to each other can be replaced by groups —O—, in some cases a methylene, ethylene or propylene residue, or an arylene residue with 6 to 22 carbon atoms, $R_3$ being an alkylene residue with 1 to 20 carbon atoms that is optionally substituted with fluorine or chlorine, in which methylene units which are not adjacent to each other can be replaced by groups —O—, in some cases a methylene, ethylene or propylene residue, or an arylene residue with 6 to 22 carbon atoms, B, B' independently of each other being a reactive or non-reactive end group, which is covalently linked to the polymer, in some cases a hydroxy, carboxy, carboxylate, carboxylic acid ester, carboxylic acid anhydride group or an amino group NHR' with R'=hydrogen, an alkyl residue with 1 to 10 carbon atoms, in some cases methyl, ethyl or i- or n-propyl, and in other cases n-propyl, or an aryl residue with 6 to 22 carbon atoms, and in even further cases an $NH_2$ group and/or an NCO group or a —CO—NH—$R_3$—$NH_2$ residue, n is a number from 75 to 215, in some cases 80 to 200, and in further cases, from 100 to 180 or 110 to 160, and a is a number of at least 1, in some cases in the range of or between 1 to 140, and in other cases in the range of 5 to 100, and in even further cases in the range of 10 to 50, and/or one or more copolymers or block copolymer with the general formula V

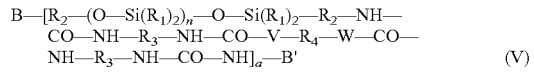

(V)

with $R_1$ independently of each other, being a monovalent hydrocarbon residue with 1 to 20 carbon atoms, optionally substituted with fluorine or chlorine, in some cases methyl, $R_2$ independently of each other, being an alkylene residue with 1 to 20 carbon atoms, in which methylene units which are not adjacent to each other can be replaced by groups —O—, in some cases a methylene, ethylene or propylene residue, or an arylene residue with 6 to 22 carbon atoms, $R_3$ being an alkylene residue with 1 to 20 carbon atoms that is optionally substituted with fluorine or chlorine, in which methylene units which are not adjacent to each other can be replaced by groups —O—, in some cases a methylene, ethylene or propylene residue, or an arylene residue with 6 to 22 carbon atoms, $R_4$ being an alkylene residue with 1 to 700 C atoms which is optionally substituted with fluorine, chlorine, C1-C6-alkyl- or C1-C6-alkyl ester, in which methylene units which are not adjacent to each other can be replaced by groups —O—, —COO—, —OCO— or —OCOO—, V, W independently of each other being —O— or —NR5, wherein R5 is hydrogen, an alkyl residue with 1 to 10 C atoms, in some cases methyl, ethyl or i- or n-propyl, or an aryl residue with 6 to 22 C atoms, B, B' independently of each other being an end group, which is covalently bound to the polymer, in some cases a hydroxy, carboxy, carboxylate, carboxylic acid ester, carboxylic acid anhydride group or an amino group NHR' with R'=hydrogen, an alkyl residue with 1 to 10 carbon atoms, in some cases methyl, ethyl or i- or n-propyl, and in other cases n-propyl, or an aryl residue with 6 to 22 carbon atoms, in some cases an $NH_2$ group or an NCO group or a —CO—NH—$R_3$—$NH_2$ residue, n is a number from 75 to 215, in some cases 80 to 200, and in other cases from 100 to 180 or 110 to 160, a is a number of at least 1, in some cases in the region of or between 1 to 140, and in other cases in the region of 5 to 100, and in even further cases in the region of 10 to 50.

The end groups B and B' can be reactive or non-reactive end groups. In this connection, it is possible that both end groups B and B' are non-reactive end groups, or that both end groups B and B' are reactive end groups. Furthermore, the one end group B can be a reactive end group, and the other end group B' can be a non-reactive end group. Accordingly, it is possible that the end groups B and B' can be the same or different. In some cases, in compound IV or in compound V, the end group B can be a hydroxy, carboxy, carboxylate, carboxylic acid ester, carboxylic acid anhydride or amino group NHR' with R'=hydrogen, an alkyl residue with 1 to 10 carbon atoms, in some cases methyl, ethyl or i- or no-propyl, in other cases n-propyl, or an aryl residue with 6 to 22 carbon atoms, wherein an $NH_2$ group is preferred. In some further cases, in compound IV or compound V, the end group B' can be an NCO group or a —CO—NH—$R_3$—$NH_2$ residue.

Those copolymers or block copolymers according to the above formulae (IV) and (V) have been shown to be very advantageous with which "n" lies in the range of 80 to 200 and "a" lies in the range of 5 to 100 or in the range of 10 to 50. In some cases, in this connection, those copolymers or block copolymers according to the above formulae (IV) and (V) have been shown to be very advantageous with which "n" lies in the range of 100 to 180 and "a" lies in the range of 5 to 100 or in the range of 10 to 50. In further cases, in this connection, those copolymers or block copolymers according to the above formulae (IV) and (V) have also been shown to be suitable in order to resolve the problems which form the basis of the present disclosure, in which "n" lies in the range of 110 to 160 and "a" lies in the range of 5 to 100 or in the range of 10 to 50.

The figure relating to the repeating units "a" is in an advantageous embodiment the average number of repeating units in the block copolymers or copolymers in according to compounds (IV) and (V), as obtained in the production of masterbatches according to the present disclosure. In some cases, the figure relating to the repeating units "a" is an absolute figure.

The copolymers or block copolymers created from the components A1) and A2) or from the components A1), A5) and A2), in some cases in the form of the compounds in accordance with formulae (IV) and (V), are provided by the method according to the present disclosure, in some cases in a quantity of at least 10 weight percent, and in other cases at least 20 weight percent, in relation to the total weight of the masterbatch.

Embodiments of the present disclosure are further attained by a polymer material which is obtained or obtainable by mixing one or more polymers and one or more masterbatches obtained or obtainable by the methods according to the present disclosure. The polymer of the polymer material, also known as the matrix polymer or polymer matrix material, can in this connection be selected from the group consisting of thermoplastics, thermoplastic elastomers, elastomers and duromers or mixtures of these. In some cases, the polymer can be selected from the group consisting of polyolefins, and in other cases polyethylene, e.g. HD-PE, and/or polypropylene or propylene copolymers, polyamides, polyesters such as polyethylene terephthalate and/or polybutylene terephthalate, polymethylmethacrylate, polyaryletherketones, polyacrylnitrile, polyethylene napthalates, polyethersulphones, polyimides, polyketones, polyphenylenesulphides, polyphenylsulphones, polysulphones, styrene-butadiene rubbers, acrylonitrile-butadiene rubbers, natural rubbers, thermoplastic elastomers based on moistened rubber, ethylene-vinyl acetate copolymers, polyhydroxybutyrate, polyactides, polyethermides, polyoxymethylene, polycarbonates, polystyrene, impact-modified polystyrene, styrene-based (co)polymers such as ABS, SAN, PS, HIPS and/or ASA, styrene-based thermoplastic elastomers such as SEBS, olefin-based thermoplastic elastomers such as LLDPE, EOC, TPV and/or EVA, PE/polyester-based thermoplastic elastomers, urethane-based thermoplastic elastomers, polyether block amides (PE-BA), PVC, polyurethanes, e.g. thermoplastic polyurethanes, and thermoplastic starch or any mixtures of these, in some cases polyethylene, polypropylene, polyamides, polyethylene terephthalate and/or polybutylene terephthalate.

The polymer materials according to the present disclosure can be obtained in some cases by mixing one or more polymer matrix materials with the masterbatches obtainable by the methods according to the present disclosure, in each case in a molten state, and cooling the mixture.

The masterbatches obtainable by the methods according to the present disclosure are characterised by a high degree of compatibility with a plurality of polymer materials or blends of these.

Embodiments of the present disclosure are further attained by a moulded body, which is obtained or obtainable through injection moulding, extruding, compression moulding, roll rotation, rotation moulding, laser sintering, Fused Deposition Modelling (FDM), granulation and/or casting of the polymer material according to the present disclosure.

With the methods according to the present disclosure, it is possible to incorporate in a reliable and economic manner pigments, the size of the primary particles of which can lie in the range of a few nanometers to several micrometers, with a homogeneous distribution into masterbatches with the exclusion of pigment aggregates and aggolmerates. With the method according to the present disclosure, it is not necessary to again melt and granulate a polymer material that has already been melted and granulated. As a result, the thermal load and thus also a degradation of the polymer material can be avoided or suppressed. A high-quality polymer material is obtained which has been compounded with a masterbatch.

With the methods according to the present disclosure, it is further possible to obtain in a reliable manner masterbatches which can be readily incorporated into polymer matrix materials, regardless of the concentration selected, and without the pigments or substance additives becoming lumpy or inhomogeneities occurring in the compounded polymer materials.

The manner of proceeding intrinsic to the methods according to the present disclosure entails the advantage that following dispersal of the dyeing agent, in some cases pigments, and/or functional additives into the, in some cases fluid, siloxane compounds (A1), further dispersal and homogenisation of the dyeing agent can be conducted in the reacted polymer matrix in the extruder, as a result of which the distribution of the dyeing agent and/or functional additive is further improved. It is also interesting that dyeing agents and functional additives can be incorporated into the copolymers or block copolymers of the masterbatch over a very broad concentration range.

After being incorporated into the polymer matrix material, the masterbatches obtained by the methods according to the present disclosure contribute to an improved flow behaviour of the melt of this matrix material. As a result, very complex injection moulding parts can also be obtained, for example, and even with very rapid injection mould charging. There is also a significant increase in throughput with extrusion applications.

Accordingly, the masterbatches according to the present disclosure do generally not have any concentration gradients of the dyeing agent or functional additive in the masterbatch. The masterbatches according to the present disclosure are also characterised by a high degree of tensile strength, high thermal resilience, excellent stress-strain characteristics, advantageous rheological behaviour and excellent permeation behaviour. In some further cases the masterbatches according to the present disclosure exhibit a high degree of compatibility with a large number of polymer matrix materials in the region of the standard usage concentrations.

The present disclosure is based on the surprising finding that when the production methods according to the present disclosure are used, masterbatches can be obtained which are suitable as universal masterbatches, i.e. they can be incorporated into a broad range of polymer matrix materials, and in an economic and reliable manner. Further, it was surprisingly found that with the masterbatches obtainable by the methods according to the present disclosure, the so-called "plate-out" effect is prevented, or can at least be suppressed. Due to the high level of compatibility of these masterbatches according to the present disclosure, there is generally also no smear formation during incorporation into polymer matrix materials. In some cases, it is also advantageous that with the methods according to the present disclosure, dyeing agents, e.g. pigments, functional additives and fillers, can be incorporated into the masterbatch regardless of dwell time and without a thermal load. Accordingly, it is surprisingly possible to also incorporate into almost any synthetic matrix materials pigments, additives and/or fillers that are difficult to disperse. And, in some further cases no use needs to be made at all of dispersing agents. Additionally, it has surprisingly been shown that the masterbatches according to the present disclosure do not lead to impairment of the mechanical properties of the polymer materials equipped with these masterbatches. The tested mechanical properties include for example the E-module, the breakage strain and fracture strain which can be determined on the basis of DIN EN ISO 527 using a traction test machine.

The present disclosure is explained below with reference to exemplary embodiments.

EXAMPLES

General Description of the Method

The selected samples were produced on a laboratory double-screw extruder (DSE) with a 25 mm screw diameter. The DSE was equipped with weighing and dosage technology for fluids. The pigment-charged silicone oil and the diisocyanate were metered in the input area of the extruder into a conveying zone tempered to 40° C. The diisocyanate component and the polydimethyl siloxane present in the form of a silicone oil were used in an equimolar ratio. Through the addition of the diisocyanate, the formation reaction for the block copolymer and thus also the formation of the masterbatch began immediately in the extruder. During the further progression of the extrusion process, all samples were heated to a temperature of 190° C. The masterbatches formed were delivered into a water bath through a perforated plate. In this bath, the masterbatch strands were cooled and then processed into granulate in a strand granulator. The pigment used to produce the masterbatches was a hard to disperse cobalt-aluminium spinel (cobalt blue—Sicopal blue K6310). Prior to the production of the masterbatch, the pigment was first incorporated into aminopropyl-terminated polydimethyl siloxane by a laboratory dissolver (1,000 revolutions per minute, 10 minutes). In order to obtain a fine dispersal of the pigment of less than 10 µm, the paste obtained from 50 weight percent pigment and aminopropyl-terminated polydimethyl siloxane was dispersed out in two friction procedures on a laboratory three-roll stool to form a paste, which was added to the extruder. The degree of dispersal was tested using a grindometer.

Example 1

According to the Present Disclosure 4,4' diisocyanatodicyclohexylmethane and, as a silicone oil with an average molar mass of 10131 g/mol, an aminopropyl-terminated polydimethyl siloxane loaded to 50 weight percent with hard to disperse pigment cobalt-aluminium spinel (cobalt blue—Sicopal blue K6310) were converted into masterbatches according to the general method description. Here, pourable granules were obtained.

3 weight percent of this masterbatch in granular form were incorporated into a polymer matrix material using an injection moulding machine. A polypropylene copolymer, polyamide 6 and polyethylene terephthalate were used as polymer matrix materials.

The moulded parts obtained showed clean, homogeneous and fault-free surfaces for all materials tested. With the three polymers named above, the masterbatches led to homogeneously coloured components, whereby no macroscopic de-mixing errors as a result of incompatibilities with the masterbatch could be detected. The masterbatches also showed no significant influence on the mechanical properties of the modified materials.

Example 2

According to the Present Disclosure 4,4' diisocyanatodicyclohexylmethane and an aminopropyl-terminated polydimethyl siloxane as a silicone mixture consisting of 60 weight percent of a first component (component A) with an average molar mass of 10131 g/mol and 40 weight percent of a further component (component B) with an average molar mass of 2923 g/mol, loaded to 50 weight percent with hard to disperse pigment with cobalt-aluminium spinel (cobalt blue—Sicopal blue K6310) were converted into masterbatches according to the general description of the method. Here, pourable granules were obtained. 3 weight percent of this masterbatch in granular form were incorporated into a polymer matrix material using an injection moulding machine. A polypropylene copolymer, polyamide 6 and polyethylene terephthalate were used as polymer matrix materials. The moulded parts obtained showed homogeneous and fault-free surfaces for all materials tested. With all the polymers named above, the masterbatches led to homogeneously coloured components, whereby no macroscopic de-mixing errors as a result of incompatibilities with the masterbatch could be detected. The masterbatches also showed no significant influence on the mechanical properties of the modified materials.

Due to the altered composition of the formula, the result in example 2 were harder, less elastic granules. Due to the increased share of urea hard segments in the masterbatch structure, the granules displayed higher viscosity than the granules from example 1.

Example 3

Not According to the Present Disclosure 4,4' diisocyanatodicyclohexylmethane and, as a silicone oil with an average molar mass of 2923 g/mol, an aminopropyl-terminated polydimethyl siloxane loaded to 50 weight percent with hard to disperse pigment cobalt-aluminium spinel (cobalt blue—Sicopal blue K6310) were converted into masterbatches according to the general method description described above. Here, pourable granules were obtained. 3 weight percent of this masterbatch in granular form were incorporated into a polymer matrix material using an injection moulding machine. A polypropylene copolymer, polyamide 6 and polyethylene terephthalate were used as polymer matrix materials. For all materials tested, the moulded parts obtained showed aesthetic impairments. While with all the polymers named above, the masterbatches led to coloured moulded parts, macroscopic de-mixing errors as a result of incompatibilities with the masterbatch were observed.

Example 4

Not According to the Present Disclosure

As initial materials for producing selection sample 4, aliphatic 4,4' diisocyanatodicyclohexylmethane and, as a silicone oil with an average molar mass of 1030 g/mol, an aminopropyl-terminated polydimethyl siloxane loaded to 50 weight percent with hard to disperse pigment cobalt-aluminium spinel (cobalt blue—Sicopal blue K6310) were used.

The initial materials were converted into masterbatches according to the general method described above. The easily pourable granules were incorporated at 3 weight percent into polypropylene copolymers, polyamide 6 and polyethylene terephthalate using an injection moulding machine. The moulded parts obtained showed inhomogeneous and faulty surfaces for all materials tested. With all polymers the masterbatches led to dyed through moulded parts. Macroscopic de-mixing errors could be detected as a result of incompatibilities with the masterbatch. The masterbatches showed significant influence on the mechanical properties of the modified materials.

The features of the present disclosure in the above description and in the claims can be essential both individually and in any combination required for the realisation of the present disclosure in its different embodiments.

The invention claimed is:

1. A method for producing a masterbatch, comprising the following steps:
   a1) providing one or more siloxane compounds, terminated with at least one or with two or more amino-, hydroxy-, carboxy-, carboxylate-, carboxylic acid ester or carboxylic acid anhydride groups, with the general formula (component A1):

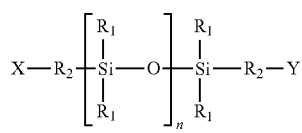

(I)

with
   $R_1$ independently of each other, being a monovalent hydrocarbon residue with 1 to 20 carbon atoms or a monovalent hydrocarbon residue with 1 to 20 carbon atoms substituted with fluorine or chlorine,
   $R_2$ independently of each other, being an alkylene residue with 1 to 20 carbon atoms, in which methylene units which are not adjacent to each other can be replaced by groups —O—, or an arylene residue with 6 to 22 carbon atoms,
   X, Y independently of each other, being a hydroxy, carboxy, carboxylate, carboxylic acid ester, carboxylic acid anhydride or amino group NHR' with R'=hydrogen, an alkyl residue with 1 to 10 carbon atoms or an aryl residue with 6 to 22 carbon atoms, and
   n is a number from 75 to 215;
and
additionally providing
a2) one or more at least bifunctional compounds (component A2), which comprises two or more groups that are linkable to X and Y, one or more dyeing agents (component A3) and component A5 as defined below, or additionally providing
a3) one or more at least bifunctional compounds (component A2), which comprises two or more groups that can be linked to X and Y, one or more functional additives (component A4) and component A5 as defined below, or additionally providing
a4) one or more at least bifunctional compounds (component A2), which comprises two or more groups that can be linked to X and Y, one or more dyeing agents (component A3), one or more functional additives (component A4) and component A5 as defined below, wherein component A5 includes
   one or more siloxane compounds, terminated with at least one or with two or more amino-, hydroxy-, carboxy-, carboxylate-, carboxylic acid ester or carboxylic acid anhydride groups, with the general formula:

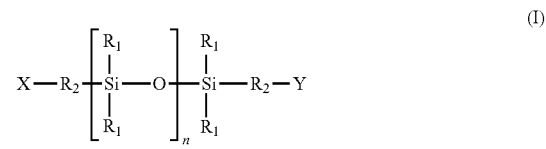

(I)

with
   $R_1$ independently of each other, being a monovalent hydrocarbon residue with 1 to 20 carbon atoms, or a monovalent hydrocarbon residue with 1 to 20 carbon atoms substituted with fluorine or chlorine,
   $R_2$ independently of each other, being an alkylene residue with 1 to 20 carbon atoms, in which methylene units which are not adjacent to each other can be replaced by groups —O—, or an arylene residue with 6 to 22 carbon atoms,
   X, Y independently of each other, being a hydroxy, carboxy, carboxylate, carboxylic acid ester, carboxylic acid anhydride or amino group NHR' with R'=hydrogen, an alkyl residue with 1 to 10 carbon atoms or an aryl residue with 6 to 22 carbon atoms, and
   n is a number of 20 to 74,
b) mixing the components according to a1) and a2), or according to a1) and a3), or according to a1) and a4) to form a mixture;
c) polymerizing the components of the mixture according to b) to form one or more polymers;
d) melting the one or more polymers formed in step c) to form a molten liquid state of the one or more polymers and/or retaining the molten liquid state of the one or more polymers in an extruder comprising one or more conveying elements or in a discontinuous internal mixer, wherein if the extruder is used, step c) and step d) or step b), step c) and step d) are conducted in the extruder;

and e) transferring the one or more polymers of step d) into a solid aggregate state.

2. The method according to claim 1, wherein at least one or more of the following criteria is met: for the siloxane compound provided in step a1), n represents a number in the range of 100 to 180, for the siloxane compound of component A5, n represents a number in the range of 30 to 60, the siloxane compound provided in step a1) is present in a fluid state at room temperature (20° C.) and the siloxane compound of component A5 is present in a fluid state at room temperature (20° C.).

3. The method according to claim 1, wherein at least one or more of the following criteria is met: the siloxane compound provided in step a1) is a siloxane compound component A1 with an average molar mass in the range of 6,000 to 14,000 g/mol and the siloxane compound of component A5has an average molar mass in the range of 2,000 to 5,500 g/mol.

4. The method according to claim 1, wherein the bifunctional compounds (component A2) according to a2), a3) or a4) is a diisocyanate with the general formula (II):

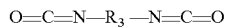
(II)

with

R$_3$ being an alkylene residue with 1 to 20 carbon atoms or an alkylene residue with 1 to 20 carbon atoms that is substituted with fluorine or chlorine, in which methylene units which are not adjacent to each other can be replaced by groups —O—, or an arylene residue with 6 to 22 carbon atoms.

5. The method according to claim 1, wherein after mixing the components in accordance with step b) one or more chain extenders (component B) are added, wherein the chain extender (component B) has the general formula III:

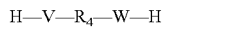
(III)

with

R$_4$ being an alkylene residue with 1 to 700 C atoms or an alkylene residue with 1 to 700 C atoms which is substituted with fluorine, chlorine, C1-C6-alkyl- or C1-C6-alkyl ester, in which methylene units which are not adjacent to each other can be replaced by groups —O—, —COO—, —OCO— or —OCOO—, and V, W independently of each other being —O— or —NR", wherein R" is hydrogen, an alkyl residue with 1 to 10 C atoms or an aryl residue with 6 to 22 C atoms.

6. The method according to claim 1, wherein the one or more dyeing agents comprise a pigment, a dye or mixtures of a pigment and a dye, or the one or more functional additives comprise nucleation agents, nanofil substances, phyllosilicates, stabilisers, antistatic agents, flame retardant agents, bonding agents, anti-blocking agents, processing aids, propellants, anti-microbial agents, or mixtures of these.

7. The method according to claim 1, wherein the compounds defined by the general formula (I) (component A1) and the bifunctional compound (component A2) are used in equimolar quantity ratios.

8. The method according to claim 1, wherein when components according to a2) or according to a4) are mixed in step b), 1 to 90 weight percent, related to the weight of the one or more polymers obtained in step e), of the dyeing agents is added, and when components according to a3) or according to a4) are mixed in step b), 1 to 80 weight percent, related to the weight of the one or more polymers obtained in step e), of the functional additives is added.

9. The method according to claim 1, wherein when step d) is carried out in the extruder, one or more of step c) and step b) are conducted in the extruder, wherein the extruder is degassed in one or more of step c) and step d).

10. The method according to claim 1, wherein one or more dispersing agents selected from the group consisting of waxes, metal soaps, organic fatty acids, organic fatty acid esters and mixtures thereof (component A6), is mixed in step b) with the components according to steps a1) and a2), or with the components according to steps a1) and a3), or with the components according to steps a1) and a4).

11. The method according to claim 1, wherein mixing the components according to steps a1) and a2) in step b) includes mixing components A1, A3 and A5 followed by adding component A2 to the mixture of components A1, A3 and A5, or wherein mixing the components according steps a1) and a3) in step b) includes mixing components A1, A4 and A5 followed by adding component A2 to the mixture of components A1, A4 and A5 , or wherein mixing the components according to steps a1) and a4) includes mixing components A1, A3, A4 and A5 followed by adding component A2 to the mixture of components A1, A3, A4 and A5 , or wherein mixing the components according to steps a1) and a2) in step b) includes mixing components A3 and A5 and a first portion of component A1 followed by adding a remaining portion of component A1 and subsequently adding component A2 to the mixture of components A1, A3 and A5, or wherein mixing the components according steps a1 and a3in step b) includes mixing components A4 and A5 and a first portion of component A1 followed by adding a remaining portion of component A1 and subsequently adding component A2 to the mixture of components A1, A4 and A5 , or wherein mixing the components according to steps a1) and a4) in step b) includes mixing components A3, A4 and A5 and a first portion of component A1 followed by adding a remaining portion of component A1 and subsequently adding component A2 to the mixture of components A1, A3, A4 and A5.

12. The method according to claim 1, wherein when step d) is carried out in the extruder, one or more of step d) and step b) are conducted in the extruder, wherein in step b), the component A2 is sprayed from a nozzle in a region of the one or more conveying elements of the extruder.

* * * * *

UNITED STATES PATENT AND TRADEMARK OFFICE
CERTIFICATE OF CORRECTION

PATENT NO. : 10,611,887 B2
APPLICATION NO. : 15/211197
DATED : April 7, 2020
INVENTOR(S) : Friedhelm Röber et al.

It is certified that error appears in the above-identified patent and that said Letters Patent is hereby corrected as shown below:

In the Claims

Column 17, Claim 3, Line 24:
"A5has" should be: --A5 has--.

Column 18, Claim 11, Line 29:
"according steps a1) and a3)" should read: --according to steps a1) and a3)--.

Column 18, Claim 11, Line 31:
"A4 and A5 ," should be: --A4 and A5,--.

Column 18, Claim 11, Line 37:
"A4 and A5 ," should be: --A4 and A5,--.

Column 18, Claim 11, Line 44:
"according steps a1) and a3)" should read: --according to steps a1) and a3)--.

Column 18, Claim 11, Line 44:
"a3in" should be: --a3 in--.

Column 18, Claim 11, Line 49:
"and A5 ," should be: --and A5,--.

Signed and Sealed this
Fourth Day of August, 2020

Andrei Iancu
*Director of the United States Patent and Trademark Office*